(12) United States Patent
Block et al.

(10) Patent No.: US 11,834,178 B2
(45) Date of Patent: Dec. 5, 2023

(54) FLAP ASSEMBLIES WITH FAILSAFE JAM-RESISTANT FLAP TRACKS

(71) Applicant: The Boeing Company, Chicago, IL (US)

(72) Inventors: Samuel L Block, Everett, WA (US); Kevin Tsai, Everett, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/656,376

(22) Filed: Mar. 24, 2022

(65) Prior Publication Data
US 2023/0303237 A1    Sep. 28, 2023

(51) Int. Cl.
*B64C 9/02* (2006.01)
*B64C 9/04* (2006.01)
*B64C 9/16* (2006.01)

(52) U.S. Cl.
CPC ............... *B64C 9/02* (2013.01); *B64C 9/04* (2013.01); *B64C 9/16* (2013.01)

(58) Field of Classification Search
CPC .. B64C 9/02; B64C 9/04; B64C 13/28; B64C 9/20; B64C 9/22; B64C 9/14; B64C 9/24; B64C 9/16; B64C 11/18; B64C 11/20
See application file for complete search history.

(56) References Cited

U.S. PATENT DOCUMENTS

| 2,271,763 | A | 2/1942 | Fowler | |
|---|---|---|---|---|
| 4,471,928 | A | 9/1984 | Cole | |
| 4,881,704 | A | 11/1989 | Hofrichter | |
| 2015/0321747 | A1* | 11/2015 | Recksiek | B64C 9/02 244/201 |
| 2019/0176963 | A1* | 6/2019 | Hsueh | B64C 13/34 |
| 2019/0233081 | A1* | 8/2019 | Budnitsky | B64C 9/02 |

FOREIGN PATENT DOCUMENTS

WO    WO-2021083822 A1 *  5/2021  ............. B64C 13/16

OTHER PUBLICATIONS

Extended European Search Report for corresponding European application No. 23162244.0, dated Aug. 4, 2023.

* cited by examiner

*Primary Examiner* — Brady W Frazier
*Assistant Examiner* — Shanna Danielle Glover
(74) *Attorney, Agent, or Firm* — McDonnell Boehnen Hulbert & Berghoff LLP (57) ABSTRACT

Example implementations relate to simple to manufacture flap assemblies with failsafe jam-resistant flap tracks. An example flap assembly may include a track having an elongate structure and a flap carriage configured to move along a length of the track. The track is configured to couple to an aircraft wing and the flap carriage includes a primary roller and a pair of secondary rollers configured to secure the flap carriage to the track. A top portion of the flap carriage is configured to couple to a flap such that movement of the flap carriage along the length of the track enables movement of the flap relative to the aircraft wing.

20 Claims, 5 Drawing Sheets

FLAP ASSEMBLIES WITH FAILSAFE JAM-RESISTANT FLAP TRACKS

FIELD

The present disclosure relates generally to mechanical systems for securing and stabilizing aircraft wing flaps, and more particularly to auxiliary flap assemblies that are simple to manufacture and configured with failsafe jam-resistant flap tracks.

BACKGROUND

A flap is a high lift device typically consisting of a hinged panel or panels mounted on an aircraft wing, such as the trailing edge of the wing. The flap's setting (e.g., the position and orientation of the flap relative to the wing) can be adjusted to increase the camber and, in some applications, the chord and surface area of the wing. The wing's camber can indicate the convexity of the upper part of the wing and the concavity of the lower part of the wing. Extending flaps during flight can increase lift and drag while also reducing stall speed, which can improve the aircraft's performance during takeoffs and landings. During a landing, the extended flaps enable the aircraft to travel at lower landing speeds that can reduce the length of the landing strip required. Extended flaps can also increase drag, which enables the aircraft to steepen its descent angle without increasing overall airspeed.

The configurations of the flaps can vary across different types of aircrafts. For instance, large jetliners are often designed with flaps that have multiple portions (e.g., three part flaps) while smaller aircrafts have appropriately sized flaps that attach to the wings via hinges. To adjust the settings of the flaps, flap mechanical systems are built into the wings, which can include actuators to extend or retract the flaps to effectively change the profiles and surface areas of wings. In addition to the actuators, flap mechanical systems can also incorporate auxiliary support structures can help stabilize and align the flaps during different settings.

SUMMARY

In one example, a flap assembly is described. The flap assembly includes a track having an elongate structure. The track is configured to couple to an aircraft wing. The flap assembly also includes a flap carriage configured to move along a length of the track. The flap carriage includes a primary roller and a pair of secondary rollers configured to secure the flap carriage to the track. A top portion of the flap carriage is configured to couple to a flap such that movement of the flap carriage along the length of the track enables movement of the flap relative to the aircraft wing.

In another example, a system is described. The system includes a flap and a flap assembly. The flap assembly includes a track having an elongate structure and a flap carriage configured to move along a length of the track. The track is configured to couple to an aircraft wing. The flap carriage includes a primary roller and a pair of secondary rollers configured to secure the flap carriage to the track. A top portion of the flap carriage is configured to couple to the flap such that movement of the flap carriage along the length of the track enables movement of the flap relative to the aircraft wing.

In an additional example, an aircraft is described. The aircraft includes an aircraft wing and a flap coupled to the aircraft wing via a flap assembly. The flap assembly includes a track having an elongate structure and a flap carriage configured to move along a length of the track. The track is configured to couple to an aircraft wing. The flap carriage includes a primary roller and a pair of secondary rollers configured to secure the flap carriage to the track. A top portion of the flap carriage is configured to couple to the flap such that movement of the flap carriage along the length of the track enables movement of the flap relative to the aircraft wing.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Example embodiments relate to different configurations of a flap assembly with a jam resistant flap track. Aircrafts can incorporate disclosed flap assemblies within flap mechanical systems to use for auxiliary stabilization and support for flaps in addition to the actuators that extend or retract the flaps. The disclosed flap assemblies are designed with mechanical features that reduce manufacturing complexity while also increasing resistance to potential jams during operation. As an example result, an aircraft's flap mechanical systems can incorporate disclosed flap assemblies instead of alternative options that are typically prone to jams and can cost more time and resources to manufacture. Jams can also drive additional cost and weight to the final design of the aircraft, which impacts customers that use the aircraft. Flaps that are not prone to jam can result in lower maintenance costs during normal operation. For instance, a flap mechanical system can use two actuators positioned near the ends of a flap and one or more disclosed flap assemblies positioned in between the actuators to provide further stabilization and alignment during flap deflection.

Figure 1:
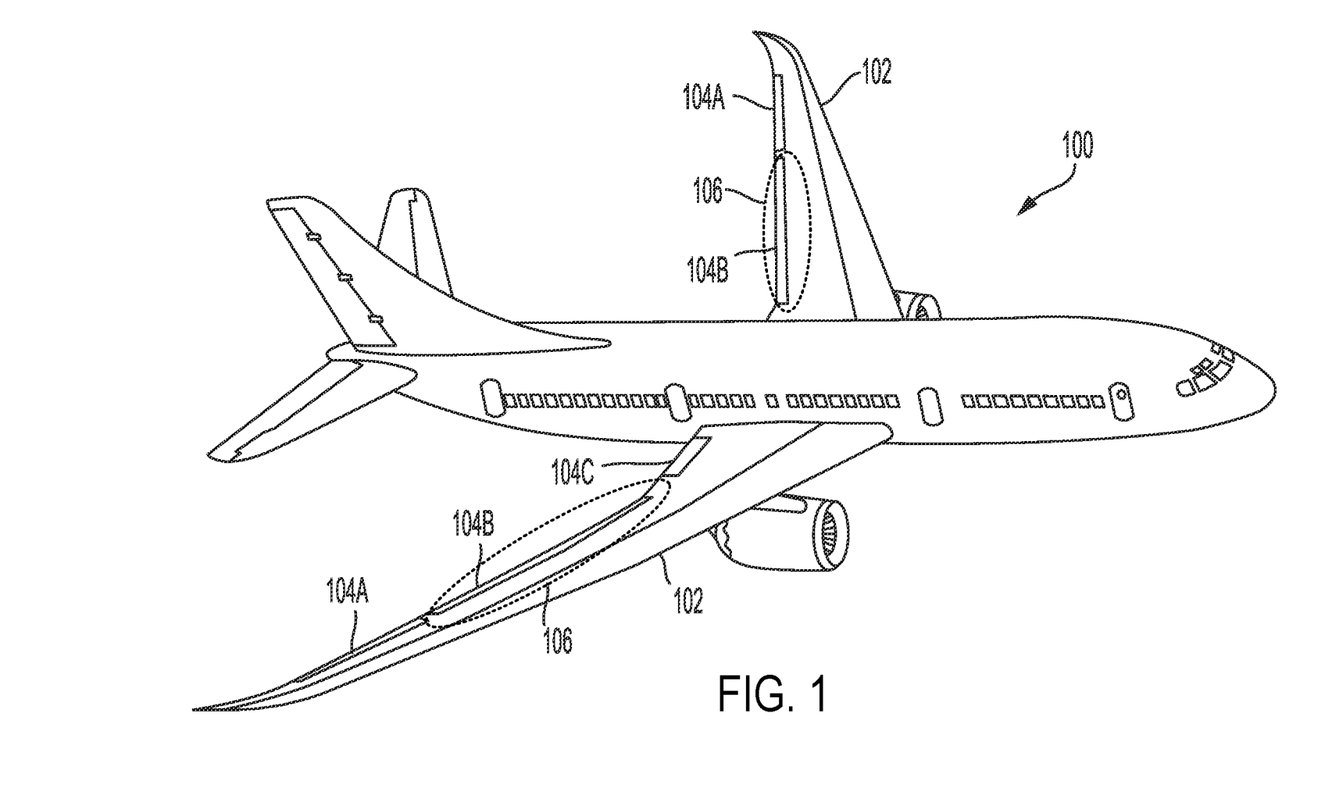
FIG. 1 illustrates a fixed-wing aircraft with flap mechanical systems, according to an example implementation.

Referring now to the Figures, FIG. 1 illustrates an aircraft 100 configured with flap mechanical systems that enable flap deflection during operation. In the example embodiment, the aircraft 100 includes two aircraft wings 102 with each wing 102 having multiple flaps labeled as a flap 104A, a flap 104B, and a flap 104C. In order to enable computing devices on the aircraft 100 to adjust the flaps 104A-104C during operations, each flap 104A-104C is connected to a flap mechanical system that is built into the aircraft wings 102 and can be used to reposition the flaps 104A-104C relative to the aircraft wing 102. For illustration purposes, the flap mechanical system 106 is outlined in FIG. 1 to enable further description of how a mechanical system may be implemented and arranged to modify the position of the flap 104B on each aircraft wing 102. Flaps 104A, 104C can similarly have flap mechanical systems (not outlined), which may operate collectively with the flap mechanical system 106 and/or independently during aircraft operations.

The aircraft 100 represents an example fixed-wing aircraft that may use flaps 104A-104C during operations, which can increase performance during takeoff and landing. When the flaps 104A-104C are positioned in an up orientation, the camber of the aircraft 100 enables the aircraft wings 102 to produce more lift. Depending on the aircraft 100, the flap 104B may extend to various degrees. For instance, the aircraft 100 may extend the flap 104B approximately 30 degrees during takeoff and 40 degrees during landing. After liftoff, the aircraft 100 may retract the flaps 104A-104C to avoid drag. As such, deploying the flaps 104A-104C can increase lift, which allows the aircraft 100 to climb during takeoff at slow speeds and also safely descend during landing also at slow speeds.

To adjust the settings of the flaps 104A-104C, aircraft computing devices may transmit signals to actuators positioned within the aircraft wings 102. For instance, the flap mechanical system 106 can include one or multiple flap actuators that generate force to adjust the setting of the flap 104B. As an example embodiment, the flap mechanical system 106 can incorporate the main flap support 200 illustrated in FIG. 2 and FIG. 3, which can use an actuator 202 to extend or retract the flap 104B.

Figure 2:
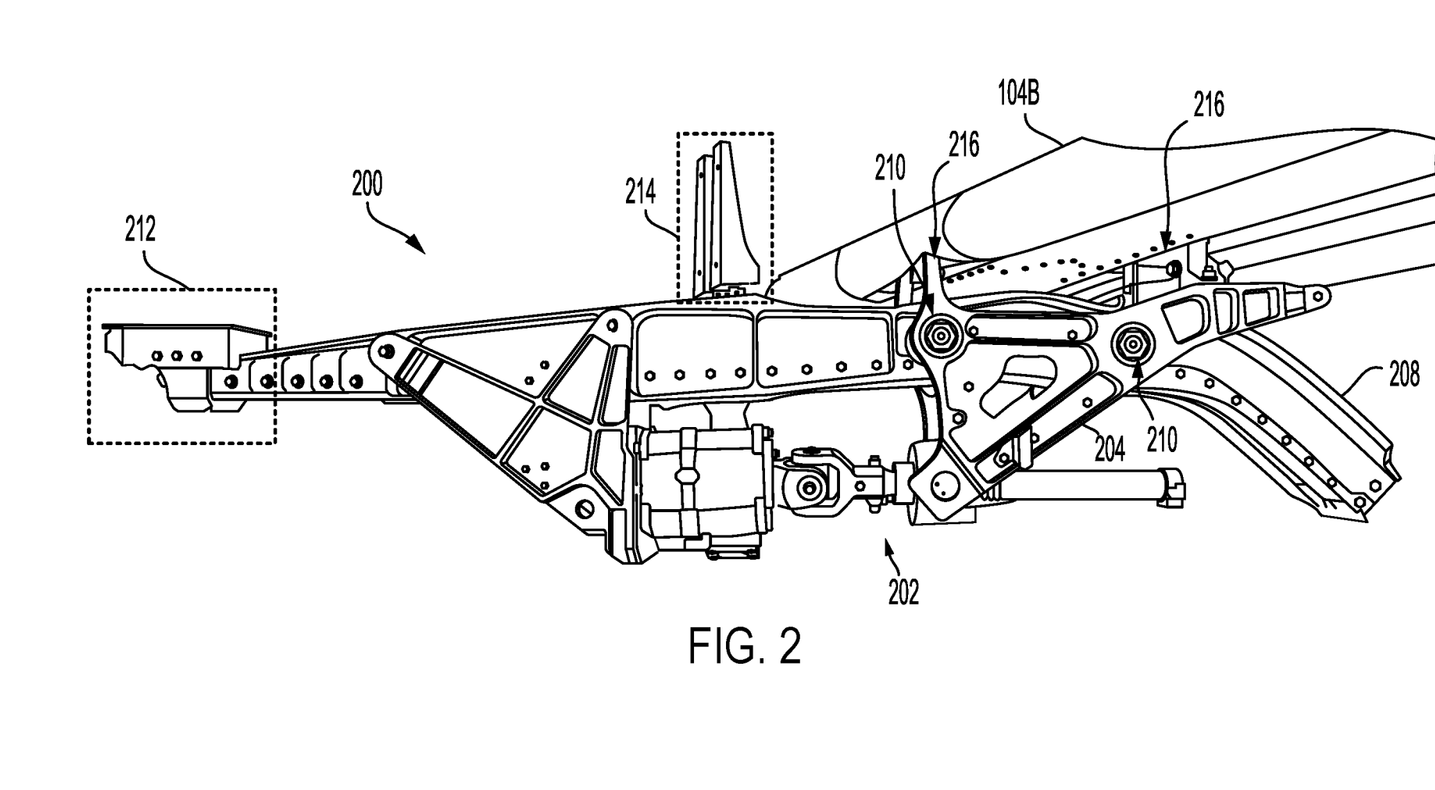
FIG. 2 illustrates a main flap support, according to an example implementation.
Figure 3:
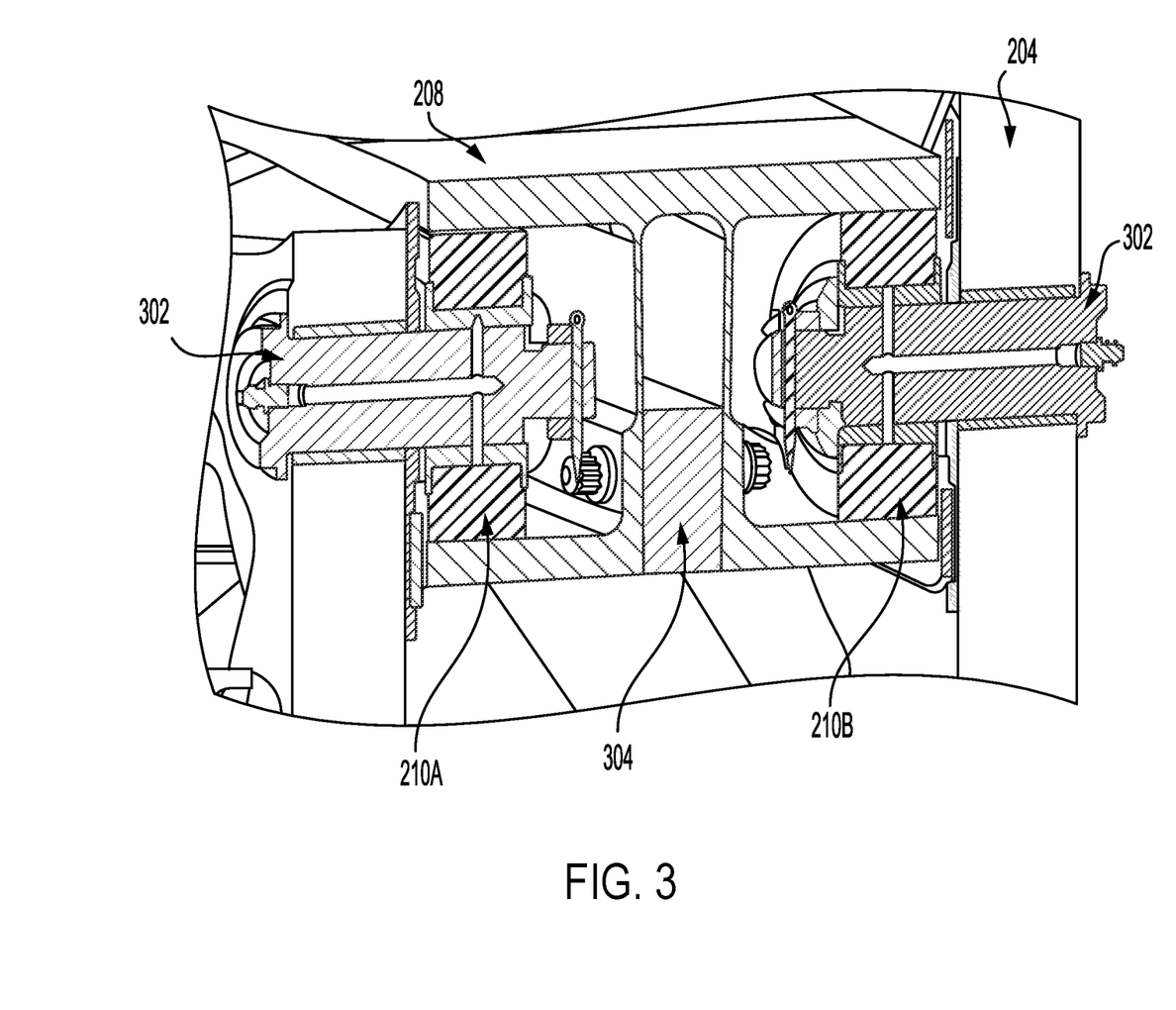
FIG. 3 illustrates a cut away view of the flap assembly and the track shown in FIG. 2, according to an example implementation.

As shown in FIG. 2 and FIG. 3, the main flap support 200 represents a typical mechanical system that can be implemented on aircrafts to adjust the setting of a flap. For instance, the aircraft 100 can incorporate multiple main flap supports 200 into flap mechanical systems on the aircraft wings 102, including the flap mechanical systems 106 that enables deflection of the flaps 104B. In the example embodiment, the main flap support 200 is configured with an actuator 202 that can move a flap carriage 204 along a track 208. In practice, the main flap support 200 is secured at a fixed position to the aircraft wing 102 via coupling component 212 and coupling component 214 while the flap carriage 204 is coupled to the flap 104B at coupling points 216. With this arrangement, the actuator 202 can then adjust the setting of the flap 104B relative to the aircraft wing 102 by changing the position of the flap carriage 204 on the track 208 via the trapped rollers 210 connecting the flap carriage 204 onto the track 208. For instance, the actuator 202 can be used to extend or retract the flap 104B, which adjusts the profile and surface area of the aircraft wing 102 to enable efficient flight at low airspeeds. In some embodiments, the actuator 202 is a lead screw type of mechanism driven by an electric or hydraulic motor that can be activated to extend or retract the flap 104B based on signals received from an aircraft computing system.

The track 208 is shown as a Pi-section beam built with a failsafe bar 304 as depicted in the cutaway view illustrated in FIG. 3. The Pi-section configuration enables trapped rollers 210 to rotate in the channels formed between the top surface and the bottom surface of the track 208, which allows the flap carriage 204 to change the setting of the flap 104B. The Pi-section configuration, however, is difficult to manufacture due to the precise size and shape requirements to form the Pi-section. In addition, manufacturing the track 208 also requires additional time to produce and incorporate the failsafe bar 304. Machining the deep center slot in hardened steel of the track 208 for the failsafe bar 304 can be challenging. Fitting and installing the failsafe bar 304 into the slot formed in the track 208 also adds further complexity to the manufacturing process.

Furthermore, the pins 302 for the trapped rollers 210 require a specific alignment in the flap carriage 204 to allow the trapped rollers 210 to smoothly rotate within the grooves of the Pi-section structure of the track 208. In some cases, this alignment might result in a jam that can damage operations of the main flap support 200.

Flap mechanical systems can also incorporate auxiliary supports to supplement the actuators. FIG. 4, FIG. 5, FIG. 6, and FIG. 7 illustrates different views of a flap assembly 400, which may be used to supplement one or more main flap supports 200 within a flap mechanical system (e.g., the flap mechanical system 106 associated with the flap 104B). The other flaps 104A, 104C shown on the aircraft wings 102 of the aircraft 100 can similarly be adjusted by flap mechanical systems that incorporate the disclosed flap assembly 400. In practice, the actuators 202 of the main flap supports 200 (or similar devices) may supply the force to adjust the setting of the attached flap 104B while the flap assembly 400 provides additional support and stabilization to the flap 104B at the different settings.

The different views of the disclosed flap assembly 400 illustrated in FIGS. 4-7 show the mechanical features of the flap assembly 400. In the example embodiment, the flap assembly 400 includes a track 402 and a flap carriage 404 that is configured to move along the track 402 using a roller interface 410 similar to the main flap support 200. In addition, the flap assembly 400 is shown with a coupling component 412 for connecting the track 402 at a fixed position on an aircraft wing (e.g., built into the aircraft wing 102 of the aircraft 100) while the top portion 414 of the flap carriage 404 is configured to connect to the bottom surface of the flap 104B.

As such, the example configuration of the flap assembly 400 illustrated in FIGS. 4-7 represents one possible configuration. Other example configurations for the flap assembly 400 are possible. For instance, the sizes, the materials used (e.g., types of metals, alloys, and rubber), and the arrangement of the mechanical components of the flap assembly 400 can differ in other example embodiments. For instance, parameters of the track 402 and/or other components of the flap assembly 400 can vary based on the type of aircraft that incorporates the flap assembly 400.

Similar to the main flap support 200 shown in FIGS. 2-3, the flap assembly 400 can be used to provide support and alignment to a flap (e.g., the flap 104B) at different settings during aircraft operations. Unlike the main flap support 200, however, the flap assembly 400 lacks an actuator in the example embodiment and may therefore provide passive support that depends on actuation by other support systems (e.g., the actuator 202 of the main flap support 200) to adjust the position of the flap 104B. For example, the flap mechanical system 106 can have two main flap supports 200 positioned near the ends of the flap 104B and the flap assembly 400 positioned in the middle of the flap 104B.

The mechanical designs of the components of the flap assembly 400 decrease overall manufacturing complexity while also reducing vulnerability to potential jams that might arise during flap deflection. In practice, the combination of the track 402 and the roller interface 410 on the flap carriage 404 enable jam-resistant performance that can supplement actuators within flap mechanical systems. Similar to the track 208 of the main flap support 200, the track 402 is a support beam with an elongate structure that can be coupled to an aircraft wing (e.g., aircraft wing 102 of aircraft 100) at a fixed position via the coupling component 412 located on an upper portion of the track 208 and/or other different potential coupling mechanisms. These coupling components can have various forms within example embodiments. Further, unlike the Pi-section configuration of the track 208, the track 402 is shown with a simple design, which is made up of sub-tracks 402A, 402B. Each sub-track 402A, 402B has a C-channel configuration, which results in the track 402 having a similar structure as the Pi-section configuration of the track 208 when the sub-tracks 402A, 402B are coupled together at seam 406 in a back-to-back configuration as further shown in FIG. 5 and FIG. 6.

In addition, unlike the Pi-section configuration of the track 208, sub-track 402A and sub-track 402B can be individually manufactured before being coupled together via one or more types of fasteners, such as bolts and screws, adhesives, welding, and/or a combination thereof. As an example result, each of the sub-tracks 402A, 402B have the physical properties to operate individually if needed, which increases crack resistance of the track 402 overall while also eliminating the need for a failsafe bar. This further reduces manufacturing complexity by eliminating a part (i.e., the failsafe bar) and additional steps during production of the track 402.

Figure 5:
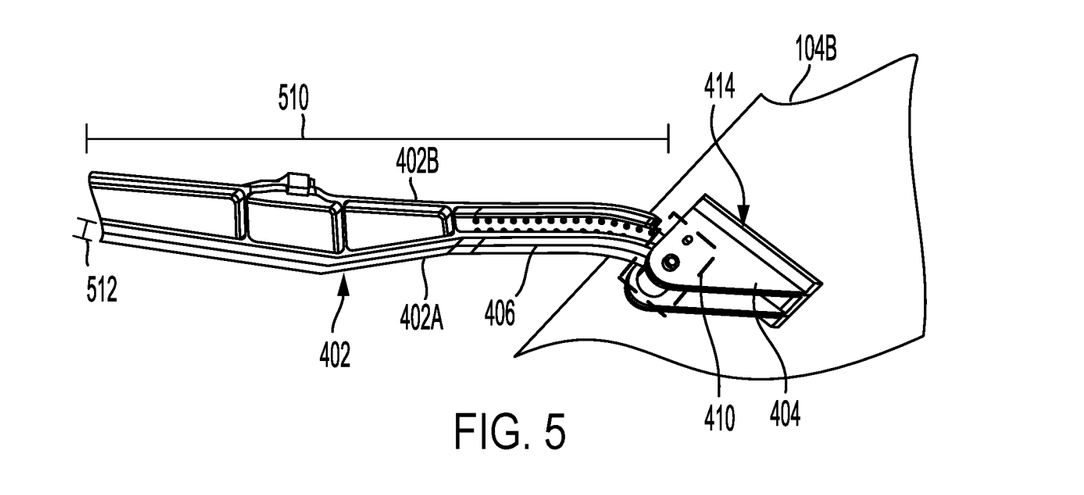
FIG. 5 illustrates another view of the flap assembly shown in FIG. 4, according to an example implementation.

The track 402 can be made out of various materials within example embodiments, such as metals and/or metallic alloys. In addition, parameters of the track 402 can depend on the type of aircraft 100 that is incorporating the flap assembly 400. As shown in FIG. 5, the length 510 of the track 402 is greater than the width 512 of the track 402, which accommodates the structures of the aircraft wing 102 and the flap 104B. The length 510 and overall structure of the track 402 can allow deflection of the flap 104B at different settings used during aircraft operations. In practice, the track 402 is configured to couple to the aircraft wing 102 via the coupling component 412 such that the length 510 of the track 402 extends approximately parallel to a path of travel by the aircraft 100.

Figure 4:
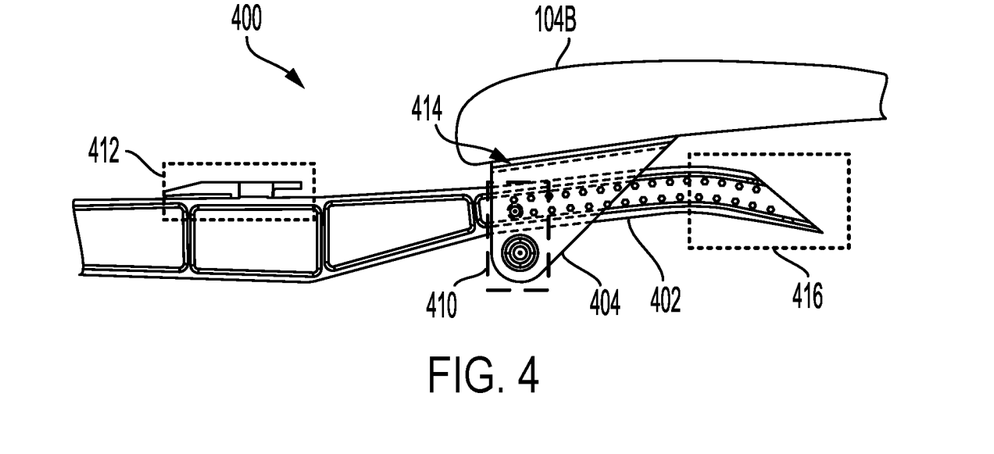
FIG. 4 illustrates an auxiliary flap assembly configured with a jam-resistant track, according to an example implementation.

As further shown in FIG. 4, the elongate structure of the track 402 includes a curved end 416 designed to enable deflection of the flap 104B relative to the aircraft wing 102. In response to actuation from the main flap support 200, the flap carriage 404 can be moved along the curved end 416 of the track 402 to secure the flap 104B up to its full angular deflection relative to the aircraft wing 102 (e.g., up to 40 degrees).

Figure 6:
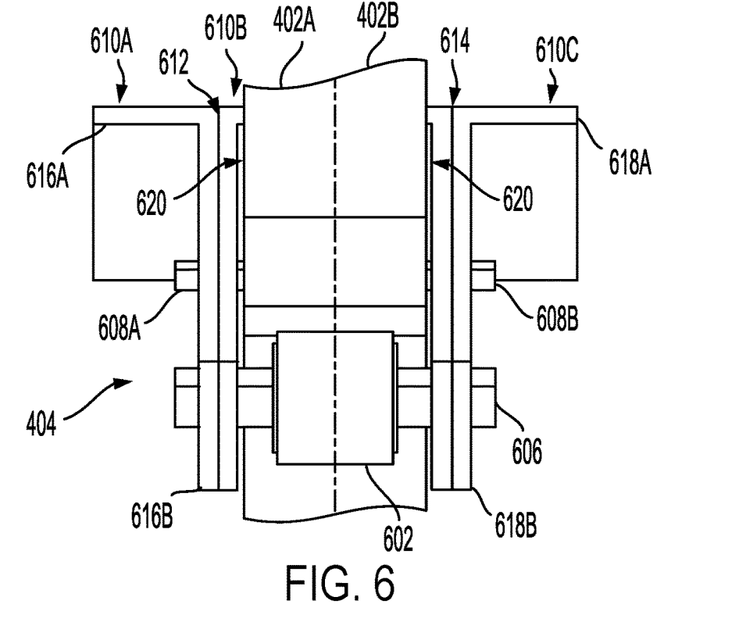
FIG. 6 illustrates a different view of the flap assembly shown in FIG. 4 and FIG. 5, according to an example implementation.
Figure 7:
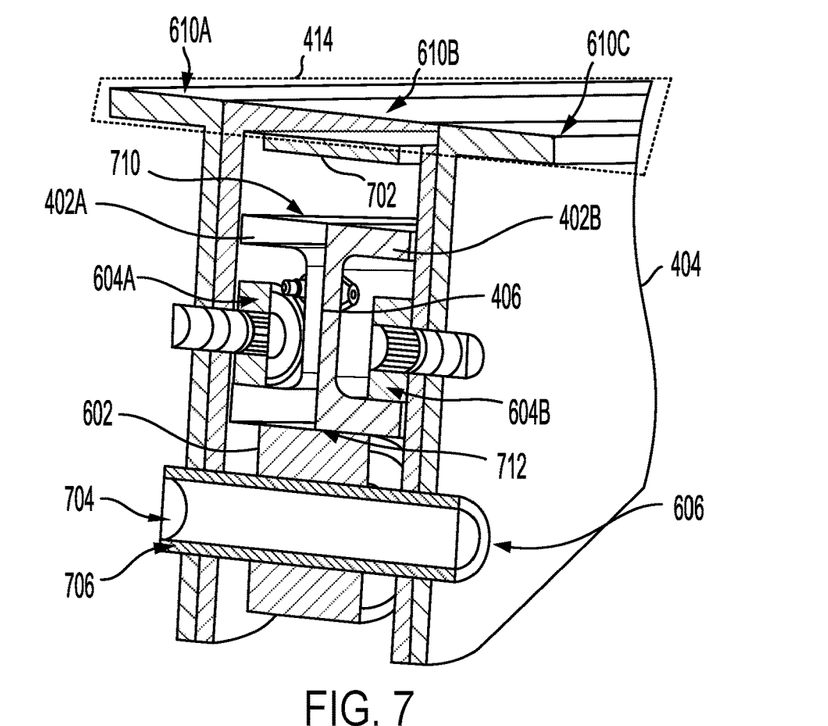
FIG. 7 illustrates a cut-away view of the flap assembly shown in FIGS. 4-6, according to an example implementation.

The flap carriage 404 is shown coupled to the track 402 and includes a roller interface 410 that enables the flap carriage 404 to move along a portion of the length 510 of the track 402. The flap 104B can rotate about the roller interface 410 while the roller interface 410 translates. In the example embodiment shown in FIGS. 4-7, the flap carriage 404 is a three piece back-to-back carriage, which increases durability of the flap carriage 404 overall while also reducing the complexity of manufacturing the flap carriage 404. In particular, FIG. 6 and FIG. 7 illustrate the combination of a side portion 610A, a middle portion 610B, and another side portion 610C that are coupled together to form the flap carriage 404. Each of the side portions 610A, 610C has an L-shape configuration while the middle portion 610B is shown with an inverted U-channel configuration. The three portions can be coupled together via one or more types of fasteners to form the flap carriage 404. In particular, the side portion 610A is coupled to the middle portion 610B forming seam 612 and the side portion 610C is coupled to the opposite side of the middle portion 610B forming seam 614.

This three-portion configuration for the flap carriage 404 reduces the manufacturing complexity of the flap carriage 404. In addition, the inverted U-channel of the middle portion 610B can be structured to securely fit around the track 402 with minor gaps 620 that enables the flap carriage 404 to move along a portion of the length 510 of the track 402 as the track 402 operates as the support beam for the flap assembly 400. In some embodiments, the components of the flap carriage 404 can be created via additive manufacturing or another type of manufacturing process.

The top portion 414 of the flap carriage 404 is shown coupled to the flap 104B such that movement of the flap carriage 104 along the length 510 of the track enables movement of the flap 104B relative to the aircraft wing 102. As such, the top portion 414 can be connected via one or more types of fasteners, such as bolts, screws, adhesives, etc.

The roller interface 410 coupled into the flap carriage 404 enables the flap carriage 404 to adjust position on the track 402. As shown in the example embodiment, the roller interface 410 includes a primary roller 602 and a pair of secondary rollers 604A, 604B, which are all positioned within the inverted U-channel of the middle portion 610B of the flap carriage 404. When the flap assembly 400 is installed, the track 402 is configured to be positioned in the inverted U-channel of the middle portion 610B such that a bottom surface 712 of the track 402 engages the primary roller 602 (e.g., sits on top of the primary roller 602) and the grooves in the C-channel of each sub-track 402A, 402B are aligned relative to the pair of secondary rollers 604A, 604B, respectively. This enables the secondary rollers 604A, 606B to rotate within the grooves in the outward-facing C-channels of the track 402 while the bottom surface 712 of the track 402 moves along with assistance from the primary rollers 602.

To further illustrate, the cut away view of the flap assembly 400 shown in FIG. 7 depicts the secondary roller 604A positioned in the groove of the C-channel formed in sub-track 402A and the secondary roller 604B positioned in the groove of the C-channel formed in the sub-track 402B. In such positions, the secondary rollers 604A-604B can rotate in the grooves of the C-channels that are part of the track 402 while the primary roller 602 provides support and enables movement of the flap carriage 404 along the track 402.

The roller interface 410 of the flap carriage 404 differs from the rollers 210 of the flap carriage 204 of the main flap support 200. As shown in the example embodiment, the primary roller 602 and the pair of secondary rollers 604A, 604B are arranged to reduce potential jams during movement of the flap carriage 404 along the track 402. The primary roller 602 is shown positioned below the track 402, which enables potential foreign object debris to fall out of the flap carriage 404 rather than causing potential jams. In addition, the secondary rollers 604A, 604B can be implemented using dead weight rollers designed with pins 608A, 608B that are able to fuse when the associated secondary roller 604A, 604B encounters any web or flange jam.

To secure the primary roller 602 in position in the inverted U-channel of the flap carriage 404, the primary roller 602 is positioned on a pin 606. In addition, the secondary roller 604A is shown positioned on a pin 608A and the secondary roller 604B is shown positioned on a pin 608B. In some embodiments, the secondary rollers 604A-604B can be implemented as two dead weight rollers.

The pin 606 of the primary roller 602 positions the primary roller 602 in the inverted U-channel of the middle portion 610B and is shown extending from the side portion 610A to the side portion 610C. In addition, the pin 606 is shown positioned near the bottom end 616B of the side portion 610A (opposite the top side 616A of the side portion 610A) and near the bottom end 618B of the side portion 610C (opposite the top side 618A of the side portion 610C). At this position, the primary roller 602 can rotate with respect to the bottom surface 712 of the track 402. In some examples, the primary roller 602 is an air-loaded roller to further support the track 402 during movement of the flap carriage 404.

As further shown, the secondary roller 604A is positioned on an inner surface and near the middle of the side portion 610A and the secondary roller 604B positioned on an inner surface and near the middle of the side portion 610C. This enables the secondary rollers 604A, 604B to be positioned in a manner that extend toward each other in an alignment on a given plane. With this arrangement, the secondary roller 604A is configured to couple to a first side of the track 402 (i.e., the inner groove of the C-channel of sub-track 402A) and the secondary roller 604B is configured to couple to a second side of the track 402 (i.e., the inner groove of the C-channel of the sub-track 402B). The secondary rollers 604A, 604B are shown arranged in a redundant configuration to further enhance performance of the flap assembly 400.

In addition, FIG. 7 also further shows that the flap carriage 404 includes an inner pad 702 configured to protect the top surface 710 of the track 402. For instance, the inner pad 702 can engage and protect the track 402 if a malfunction occurs at one or both of the pair of secondary rollers 604A, 604B. The inner pad 702 is configured to act as a load path in the event the flap 104B and track 402 contact. The secondary rollers 604A, 604B can be dead weight rollers in some embodiments. The dead weight rollers can take minor flap loads while taxiing on the runway. By using two deadweight rollers, the remaining roller takes limit load until the next maintenance check. In instances where both of the secondary rollers 604A, 604B break, the inner pad 702 provides cushion to the top surface 710 of the track 402 to continue normal operation. This failure may likely cause a flap misfair (e.g., misalignment due to component failure) that is visible during any inspection of the aircraft. As further shown in FIG. 7, the pin 606 of the primary can have a pin-in-pin configuration made up of interior pin 704 and exterior pin 706, which increases durability of the pin 606 and the primary roller 602 for fail safety. The pin-in-pin configuration of the pin 606 allows either of the interior pin 704 and the exterior pin 706 to take limit load if other pin cracks. This increases overall durability of the primary roller 602 during operations.

By the term "substantially" or "about" used herein, it is meant that the recited characteristic, parameter, or value need not be achieved exactly, but that deviations or variations, including for example, measurement error, measurement accuracy limitations, friction, and other factors known to skill in the art, may occur in amounts that do not preclude and/or occlude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A flap assembly comprising:
    a track having an elongate structure, wherein the track is configured to couple to an aircraft wing; and
    a flap carriage having an inverted U-channel formed by a middle portion and side portions of the flap carriage, wherein the flap carriage is configured to move along a length of the track and includes a primary roller and a pair of secondary rollers positioned inside the inverted U-channel and configured to secure the flap carriage to the track,
    wherein a top surface of the flap carriage is configured to couple to a flap such that movement of the flap carriage along the length of the track enables movement of the flap relative to the aircraft wing, and
    wherein a first end of each side portion of the flap carriage is coupled to the middle portion of the flap carriage and a pin of the primary roller is positioned proximate a second end of each side portion such that the primary roller is configured to couple to a bottom surface of the track.

2. The flap assembly of claim 1, wherein the pin of the primary roller comprises a pin-in-pin configuration.

3. The flap assembly of claim 1, wherein the first secondary roller and the second secondary roller are aligned on a given plane, and
    wherein first secondary roller is configured to couple to a first side of the track and the second secondary roller is configured to couple to a second side of the track.

4. The flap assembly of claim 1, wherein the track comprises a first sub-track having a C-channel configuration and a second sub-track having the C-channel configuration, and
    wherein the first sub-track and the second sub-track are coupled together in a back-to-back configuration.

5. The flap assembly of claim 4, wherein each secondary roller in the pair of secondary rollers is configured to couple to an inner portion of the C-channel configuration of a given sub-track.

6. The flap assembly of claim 1, wherein the flap carriage further includes an inner pad configured to protect a top surface of the track in response to a malfunction at one or both of the pair of secondary rollers.

7. The flap assembly of claim 1, wherein the primary roller is actuated via pneumatic means.

8. The flap assembly of claim 1, wherein the pair of secondary rollers are two rollers arranged in a redundant configuration and configured to take minor flap loads while taxiing on a runway.

9. The flap assembly of claim 1, wherein the flap carriage is a three piece back- to-back carriage.

10. The flap assembly of claim 1, wherein an upper portion of the track is configured to couple to a bottom surface of the aircraft wing.

11. The flap assembly of claim 1, wherein a length of the track is greater than a width of the track, and wherein the track is configured to couple to the aircraft wing such that the length of the track extends parallel to a path of travel by the aircraft.

12. The flap assembly of claim 1, wherein the elongate structure of the track includes a curved end, and to move in a downward angle relative to the aircraft wing.

13. A system comprising:
a flap; and
a flap assembly comprising:
a track having an elongate structure, wherein the track is configured to couple to an aircraft wing; and
a flap carriage having an inverted U-channel formed by a middle portion and side portions of the flap carriage, wherein the flap carriage is configured to move along a length of the track, and includes a primary roller and a pair of secondary rollers positioned inside the inverted U-channel and configured to secure the flap carriage to the track,
wherein a top surface of the flap carriage is configured to couple to the flap such that movement of the flap carriage along the length of the track enables movement of the flap relative to the aircraft wing, and
wherein a first end of each side portion of the flap carriage is coupled to the middle portion of the flap carriage and a pin of the primary roller is positioned proximate a second end of each side portion such that the primary roller is configured to couple to a bottom surface of the track.

14. The system of claim 13, wherein the track comprises a first sub-track having a C-channel configuration and a second sub-track having the C-channel configuration, and wherein the first sub-track and the second sub-track are coupled together in a back-to-back configuration.

15. The system of claim 14, wherein each secondary roller in the pair of secondary rollers is configured to couple to an inner portion of the C-channel configuration of a given sub-track.

16. The system of claim 13, further comprising:
at least one main flap support coupled to the flap, wherein the at least one main flap support includes an actuator configured to provide power to move the flap; and
wherein the flap carriage moves along the track in response to the actuator providing power to move the flap.

17. An aircraft comprising:
an aircraft wing;
a flap coupled to the aircraft wing via a flap assembly comprising:
a track having an elongate structure, wherein the track is coupled to the aircraft wing; and
a flap carriage having an inverted U-channel formed by a middle portion and side portions of the flap carriage, wherein the flap carriage is configured to move along a length of the track and includes a primary roller and a pair of secondary rollers positioned inside the inverted U-channel and configured to secure the flap carriage to the track,
wherein a top surface of the flap carriage is configured to couple to the flap such that movement of the flap carriage along the length of the track enables movement of the flap relative to the aircraft wing, and
wherein a first end of each side portion of the flap carriage is coupled to the middle portion of the flap carriage and a pin of the primary roller is positioned proximate a second end of each side portion such that the primary roller is configured to couple to a bottom surface of the track.

18. The system of claim 13, wherein the pin of the primary roller comprises a pin-in-pin configuration.

19. The system of claim 13, wherein the flap carriage is a three piece back-to-back carriage.

20. The system of claim 13, wherein the elongate structure of the track includes a curved end, and
wherein movement of the flap carriage along the curved end of the track enables the flap to move in a downward angle relative to the aircraft wing.

* * * * *